Nov. 20, 1945.  J. T. THORNTON  2,389,567
PEANUT HARVESTER
Filed May 28, 1945    3 Sheets-Sheet 3

J.T.Thornton
INVENTOR.

BY
ATTORNEYS.

Patented Nov. 20, 1945

2,389,567

UNITED STATES PATENT OFFICE 2,389,567

PEANUT HARVESTER

John T. Thornton, Parrott, Ga.

Application May 28, 1945, Serial No. 596,183

3 Claims. (Cl. 56—346)

This invention relates to machines for harvesting peanuts and is a continuation in part of an application filed by me on July 20, 1944, Serial Number 545,817, one of the objects being to provide a machine which can be connected to the rear of a tractor and can be operated by the power take-off of the tractor while the machine is being pulled forwardly.

A further object is to provide a harvesting machine which will pick up the vines after they have been plowed up by the tractor, will dislodge dirt from the peanuts, convey the vines and peanuts upwardly, deposit the material on a rack, and subsequently dump it at desired points.

A still further object is to provide a mechanism of this character requiring the services of only one man who not only drives the tractor but also controls the action of the harvester.

Another object is to provide a means whereby, due to natural vibrations set up by the machine while in motion, the separation of dirt from the peanuts is expedited.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings

Figure 1:
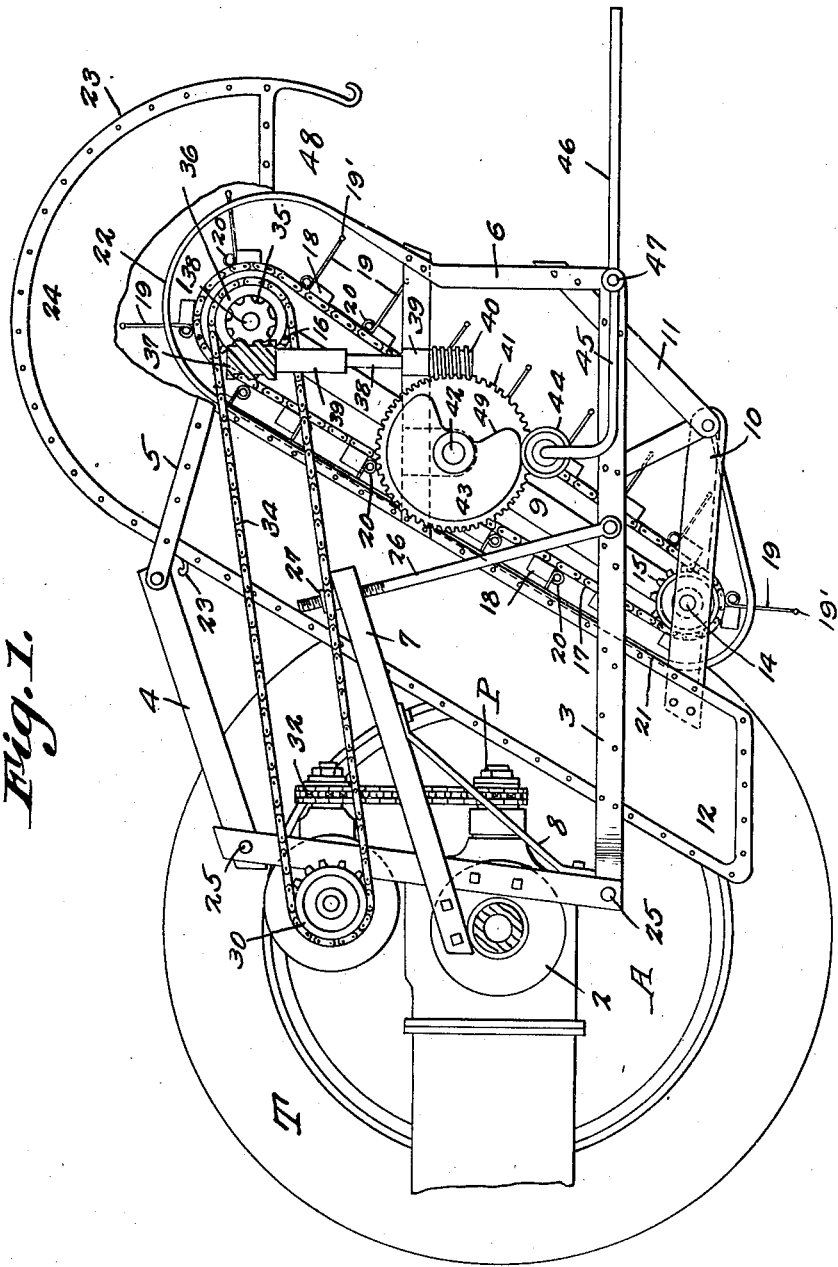
Figure 1 is a side elevation of the harvester, a portion of the tractor to which it is attached being shown, parts being broken away.
Figure 2:
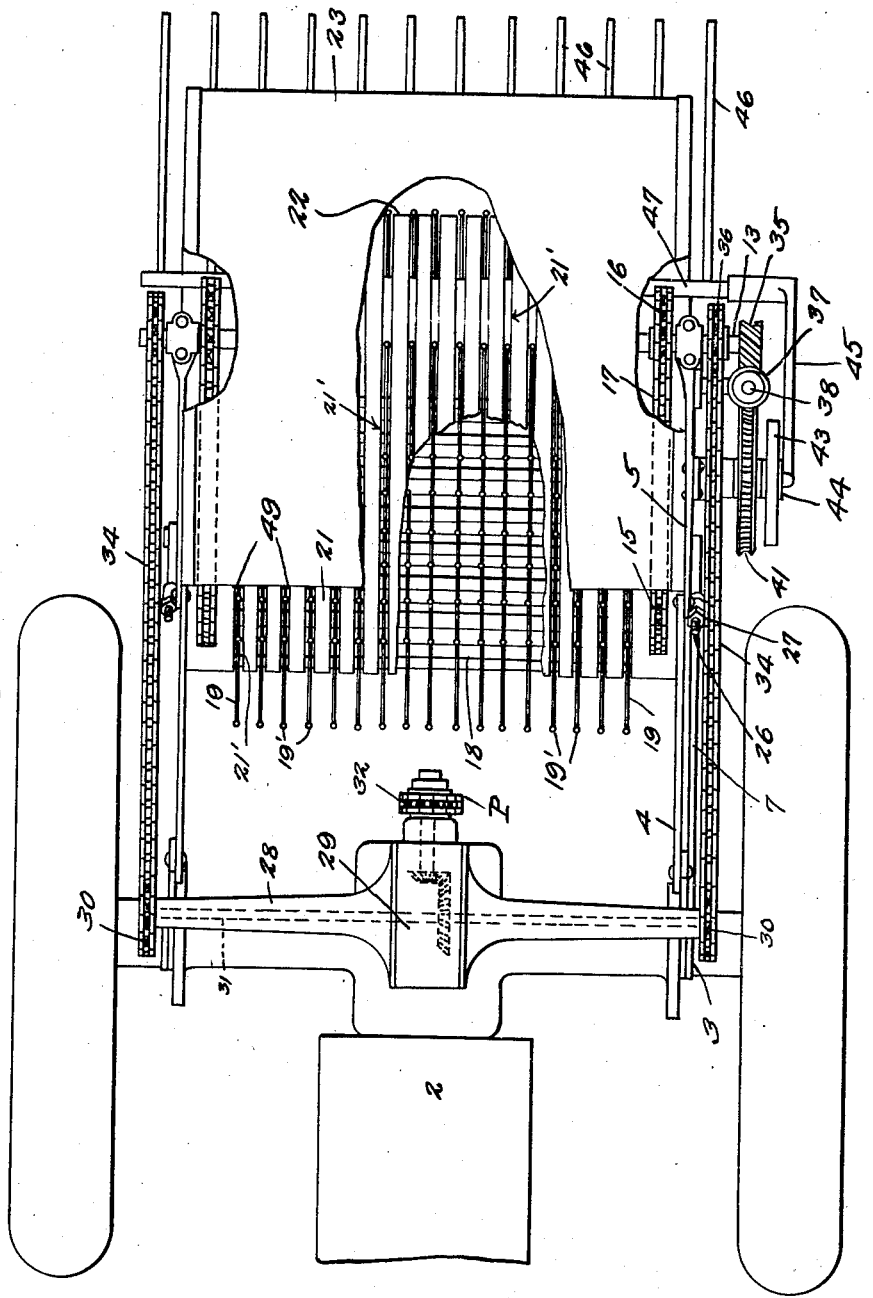
Figure 2 is a top plan view of the structure shown in Fig. 1, a portion being broken away.

Referring to the figures by characters of reference, T designates a portion of a tractor used for plowing up the peanut vines by the use of suitable means connected thereto for that purpose and which constitutes no part of the present invention. The rear axle of the tractor has been indicated at A and carries a power take-off P to be driven by the motor of the tractor at the will of the operator and by the means commonly employed.

A frame 1 is located between the rear wheels of the tractor and can be secured to the axle housing flange 2. Extending backwardly from the lower portion of the frame 1 are the rails 3 constituting the base of the frame of the attachment, it being understood that these bars 3 are adjacent to the wheels of the tractor so that the entire attachment will be of such width as to pick up vines plowed up by a gang of plows used for that purpose. The frame is also provided with top bars 4 extending rearwardly and upwardly and with upper side bars 5. Posts 6 are extended upwardly from the back ends of the bottom rails 3 and intermediate rails 7 which are secured to the flanges 2 and frame members 1, are extended rearwardly and upwardly and are suitably braced, as indicated at 8.

Located between and secured to the respective bars 3 are the upwardly and rearwardly inclined side bars 9 of an elevator. The lower ends of these side bars are secured to lower side strips 10 the rear ends of which are joined by braces 11 to the respective posts 6. The forward ends of these side strips 10 are attached to the side boards or shields 12 of the elevator which, in turn, are attached to the side bars 3 and 5 of the frame of the attachment.

A transverse shaft 13 is journalled in the upper end portions of the side bars 9 and another transverse shaft 14 is journalled in the lower end portions of these bars. Both of these shafts carry sprockets, the lower shaft being provided with sprockets 15 while the upper shaft 13 is provided with larger sprockets 16. The endless chains 17 of an elevator are mounted on the upper and lower sprockets and are connected by parallel transverse bars 18 which are regularly spaced one from the other. To each of these bars is secured a longitudinal series of pick-up fingers 19. These fingers have slight enlargements 19' at their free ends and are located at the rear edges of the advancing bars 18. If desired, each finger can include an integral spring coil 20 whereby a certain amount of resiliency is provided where the fingers meet with unyielding obstructions.

Supported between the inclined rear edges of shields 12 and along lines substantially parallel with the forward inclined flight of the endless carrier formed by chains 17 and their connections, is a guide 21 which can be formed of a longitudinally slotted plate or of spaced strips of material joined together at their ends. This guide has the slots 21' therein located where the pick-up fingers 19 can travel within them and the lower end of the guide is curved downwardly and rearwardly along lines substantially concentric with shaft 14 and is then extended rearwardly to the back ends of the strips 10 where it is secured and where it is outside of the path of the fingers as will be apparent by referring to Fig. 1.

Those portions of the guide or strips located between the pick-up fingers are of thin sheet metal and thus constitute vibratory elements which will be vibrated when the machine moves over the surface of the ground.

The upper end of the guide 21 is extended along curved lines upwardly, backwardly and downwardly over the shaft 13 and gradually leaves the path of the fingers 19 so that they can move out of the slots in the guide as they begin to move downwardly from their uppermost positions. Likewise the slots in the lower end of this guide are located so that the descending fingers 19 can move into them as they approach the lower end of the carrier. This upper arcuate portion of the guide, by reason of its particular arrangement and shape, constitutes a stripper which has been designated at 22 so that material riding along the guide 21 under the impulse imparted to it by the ascending fingers 19, will gradually be moved outwardly along the fingers as they move over shaft 13 and downwardly relative thereto until ultimately the fingers are completely withdrawn from the material and said material is free to fall downwardly off of the rear end of the stripper 22.

The side board of shields 12 have their upper ends curved rearwardly and downwardly following the general contour of the stripper 22 and the upper arcuate portions of these boards or shields are connected by an arcuate top plate 23 whereby material is prevented from being thrown upwardly and outwardly and must of necessity follow the curved path defined by stripper 22, plate 23, and the arcuate portions 24 of the side boards or shields.

As shown in Fig. 1 the upper end portion of the guide 21 is attached to the upper end of the post 6.

It will be noted that the bars 3 and 4 are pivotally connected to the frame members 1 as shown at 25. Therefore it is possible for the structure carried by the bars 3 and 4 to be moved upwardly and downwardly relative to the tractor for the purpose of bringing the pick-up carrier to a desired level above the surface of the ground. This adjustment can be effected by means of threaded rods 26 pivotally joined at their lower ends to the side bars of the carrier and slidably mounted adjacent their upper ends in the intermediate bars 7. By means of nuts 27 on the rods, longitudinal adjustment of the rods can be effected and, consequently, a corresponding adjustment of the harvesting attachment can be effected.

Mounted on the frame member 1 is a shaft housing 28 extending transversely of the attachment and including a gear case 29. Sprockets 30 are mounted on the ends of the shaft 31 in housing 28 and another sprocket 32 is mounted on the gear case and is adapted to transmit motion through suitable gears in the case 29 to the shaft 31. Sprocket 32 receives its motion through a chain 33 from the power take-off sprocket T heretofore referred to.

The sprockets 30 operate chains 34 which drive sprockets 35 on the shaft 13 so that by coupling the power take-off P to the tractor motor, motion can be transmitted therefrom to chain 33, sprockets 32, shaft 31 and chains 34 to the elevator so that the fingers will be caused to move in the direction indicated by the arrows in Fig. 1.

A worm gear 36 is secured to shaft 13 and engages and rotates a worm 37 carried by the upper end of a shaft 38 which is journalled in suitable bearings provided therefor as indicated at 39, and has a worm 40 secured to its lower end. This worm, in turn, engages a worm wheel 41 mounted for rotation on the stud 42. A cam 43 is joined to and rotates with the worm gear 41 and has its periphery normally engaged by a roller 44. This roller is carried by an arm 45 extended forwardly from a dump rack 46 which is pivotally mounted in the frame of the harvester as indicated at 47. As long as the roller 44 is in contact with the arcuate peripheral portion of the cam 43, as shown in Fig. 1, the dump rack 46 will be maintained in a substantially horizontal position directly under the outlet 48 from which elevated material is discharged so that said material thus can drop onto and pile upon the rack. Once during each rotation of the cam 43, however, a recess 49 in the periphery of the cam will be brought to position over the roller 44 so that said roller can thus swing upwardly, allowing the rack 46 to dump its contents. As the rotation of the cam continues, the roller 44 will be pushed downwardly and the rack restored to its initial position.

It is believed that the operation of this attachment will be apparent from the foregoing description. As before explained, motion can be transmitted to the carrier so as to drive the fingers 19 in the direction indicated by the arrows. Thus as the fingers sweep forwardly and upwardly at the lower end of the carrier, they will engage the vines which have been plowed up by the plows ordinarily joined to the tractor and after they have been picked up, they will be carried upwardly along the guide 21 and between the boards or shields 12. The parts are so geared that this upward movement of the fingers will be at a speed somewhat greater than the forward movement of the tractor so that there will be no clogging of the elevator at its base but all of the vines supplied thereto will be carried off as fast as they reach the elevator.

The fingers will carry the vines upwardly along the guides and over the stripper 22 which will act, as before explained, to pull the vines off of the fingers after which they will be delivered through the outlet 48 and onto the rack 46.

As these guides are unsupported, except at their ends and as they are of slotted sheet metal of a thinness permitting flexibility, or of spaced strips or slats, of similar material providing slots therebetween, it is obvious that they are free to vibrate and, as the machine operates during its movement over the surface of the ground, the motion of the machine will cause these guides to vibrate naturally and effect a rapid separation of dirt from the peanuts as the material moves upwardly along the guides.

During this operation the cam 43 is being rotated slowly and after a predetermined time interval, the cam will release the rack to dump its contents and then restore the rack to its initial or load-supporting position. This operation will go on continuously as long as the vines are to be gathered, and the machine will require no attention other than an occasional adjustment by means of rods 26. At other times the sole operator can confine his attention to the operation of the tractor and plows carried thereby.

Figure 3:
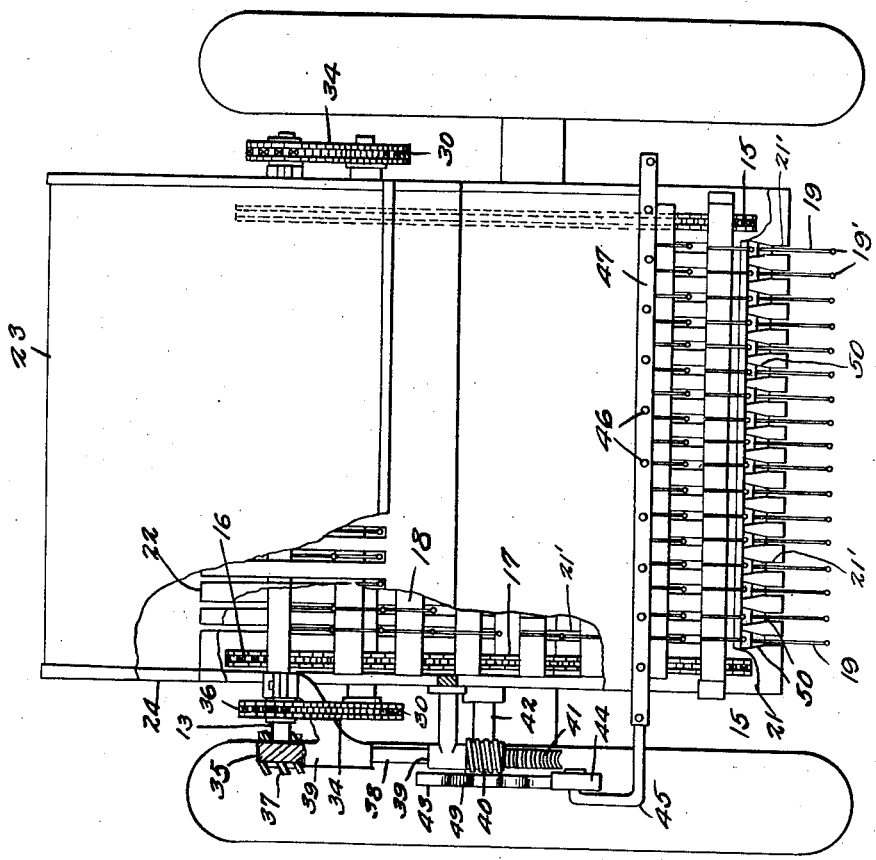
Figure 3 is a rear elevation, parts being broken away.

To prevent the fingers from becoming caught in the guide where they enter the same adjacent to its lower end, it is preferred to widen the lower ends of the slots 49 in the guide 21 as shown at 50 in Fig. 3, these slots gradually increasing in width toward their rear ends so that the fingers can enter them freely.

By providing enlargements 19' on the fingers 19 they act more efficiently and pick up the vegetation from the ground because the tendency to withdraw from the vegetation is reduced.

What is claimed is:

1. In a peanut harvester the combination with a movably supported structure and means for propelling the structure over the surface of the ground, of an inclined endless carrier mounted in said structure, pickup fingers extending from the carrier, a guide formed of flexible sheet material anchored at its ends back of the upper and lower portions respectively of the carrier and having intermediate portions extending over and under the carrier and upwardly along the advancing portion of the carrier, means for actuating the carrier to move the advancing portion upwardly to elevate material along the guide, said guide having slots extending lengthwise thereof for the reception of the fingers and said guide constituting means for supporting material engaged by the fingers, said guide being of such a thickness as to vibrate naturally and separate dirt from the elevated material while the machine is in motion.

2. A machine for harvesting peanuts including a structure mounted for movement over the surface of the ground, an inclined endless conveyor carried by said structure, resilient fingers extending upwardly from the conveyor positioned to engage and pick up material and carry it upwardly with the conveyor, means for actuating the conveyor during the movement of the machine over the surface of the ground, a guide spaced from and substantially parallel with the elevating portion of the conveyor and having longitudinal slots through which the fingers extend, said guide constituting a support for material to be separated, the upper and lower ends of the guide being extended over and under the conveyor and fixedly anchored at their terminals, said guide being of sheet material of such thinness as to vibrate naturally during the movement of the machine over its supporting surface, thereby to effect separation of materials being elevated by the carrier, the upper and lower portions of the guide being extended rearwardly away from the carrier toward the anchored terminal, the upper portion of said guide constituting a stripping means.

3. A machine for harvesting peanuts or the like including a movably supported structure, an inclined conveyor carried thereby, having material engaging fingers extending therefrom, means for actuating the conveyor to elevate material engaged by the fingers, and a guide overlying and substantially parallel with the material elevating portion of the conveyor, said guide having slots through which the fingers extend, the guide being fixedly anchored at its ends and being of such thickness and flexibility as to vibrate naturally when the machine is in motion over a supporting surface.

JOHN T. THORNTON.